(12) United States Patent
Winsor et al.

(10) Patent No.: US 11,528,307 B2
(45) Date of Patent: Dec. 13, 2022

(54) NEAR REAL-TIME COLLABORATION FOR MEDIA PRODUCTION

(71) Applicant: Avid Technology, Inc., Burlington, MA (US)

(72) Inventors: Christopher M. Winsor, Oakley, CA (US); Paul Vercellotti, Albany, CA (US); Jeffrey A. Lomicka, Chelmsford, MA (US); Timothy H. Claman, Andover, MA (US)

(73) Assignee: AVID TECHNOLOGY, INC., Burlington, MA (US)

( * ) Notice: Subject to any disclaimer, the term of this patent is extended or adjusted under 35 U.S.C. 154(b) by 106 days.

(21) Appl. No.: 17/093,748

(22) Filed: Nov. 10, 2020

(65) Prior Publication Data

US 2021/0409471 A1    Dec. 30, 2021

Related U.S. Application Data

(60) Provisional application No. 63/046,597, filed on Jun. 30, 2020.

(51) Int. Cl.
*G06F 15/16* (2006.01)
*H04L 65/60* (2022.01)

(52) U.S. Cl.
CPC .................................. *H04L 65/60* (2013.01)

(58) Field of Classification Search
CPC ........................................................ H04L 65/60
See application file for complete search history.

(56) References Cited

U.S. PATENT DOCUMENTS

| 2002/0031756 | A1* | 3/2002 | Holtz | G09B 7/02 434/362 |
| 2012/0047077 | A1* | 2/2012 | Humphrey | G06Q 10/101 705/300 |
| 2013/0173709 | A1* | 7/2013 | Yerli | H04L 65/403 709/204 |

(Continued)

OTHER PUBLICATIONS

Source Connect, Source-Connect Auto-Restore and Auto-Replace, Aug. 13, 2020, 3 pages.

*Primary Examiner* — Razu A Miah
(74) *Attorney, Agent, or Firm* — Oliver Strimpel

(57) ABSTRACT

Near real-time collaborative media production by parties located remotely from each other is facilitated by the described methods. Automated dialog replacement with voice talent, editing system operator, and director located remotely from each other is supported by generating synchronized near real-time feeds for the operator and director. Pre-recorded media played back from the editing system is streamed without delay to the talent. A pre-recorded media feed is also delayed to synchronize it with the incoming talent stream, which was recorded in sync with the pre-recorded media stream when received by the talent. The synchronized feed is output to the operator and streamed to the director. Talkback channels and webcam video with appropriate synchronization delays support communication among the parties. Other methods support automatic punch-in and punch-out of remotely recorded dialog replacement, and automatic contextual switching and overlaying of inter-party communication video based on the state of the media editing application.

19 Claims, 6 Drawing Sheets

(56) References Cited

U.S. PATENT DOCUMENTS

| | | | |
|---|---|---|---|
| 2014/0059182 A1* | 2/2014 | Miura | H04L 65/60 |
| | | | 709/219 |
| 2014/0179441 A1* | 6/2014 | Morrison, III | H04N 21/44209 |
| | | | 463/43 |
| 2014/0181864 A1* | 6/2014 | Marshall | H04N 21/2547 |
| | | | 725/38 |
| 2015/0121252 A1* | 4/2015 | Yerli | H04L 65/403 |
| | | | 709/204 |
| 2015/0281301 A1* | 10/2015 | Neff | H04L 67/104 |
| | | | 725/116 |
| 2015/0339020 A1* | 11/2015 | D'Amore | G06F 3/0484 |
| | | | 715/753 |
| 2015/0347971 A1* | 12/2015 | D'Amore | G06Q 10/101 |
| | | | 705/300 |
| 2016/0294799 A1* | 10/2016 | Miller | G06F 3/1454 |
| 2016/0328396 A1* | 11/2016 | Rajapakse | H04L 65/80 |

* cited by examiner

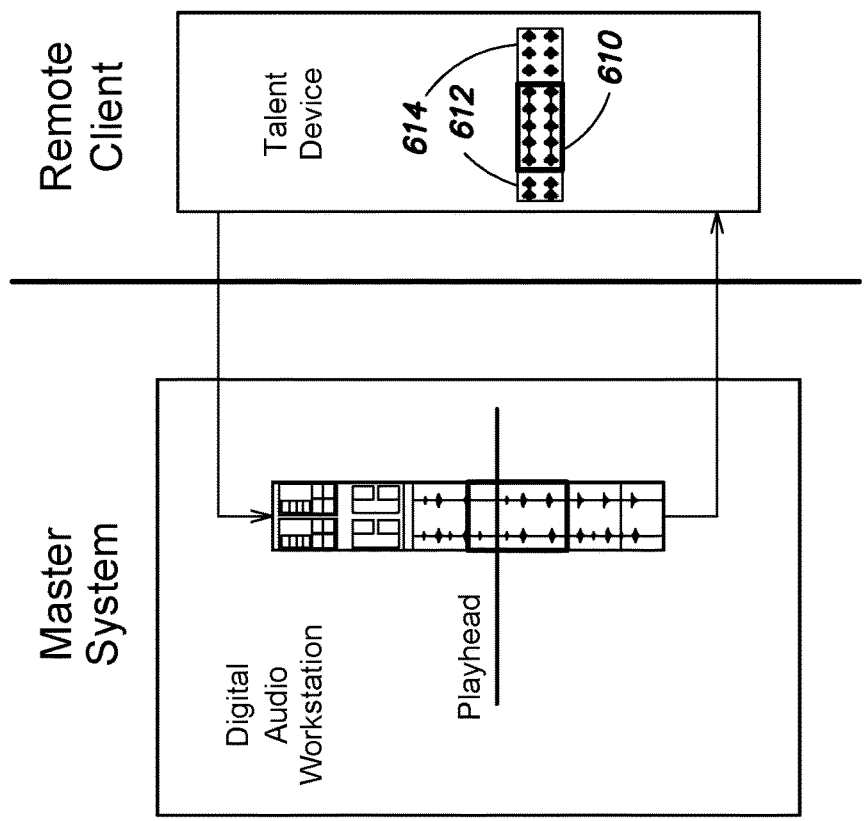
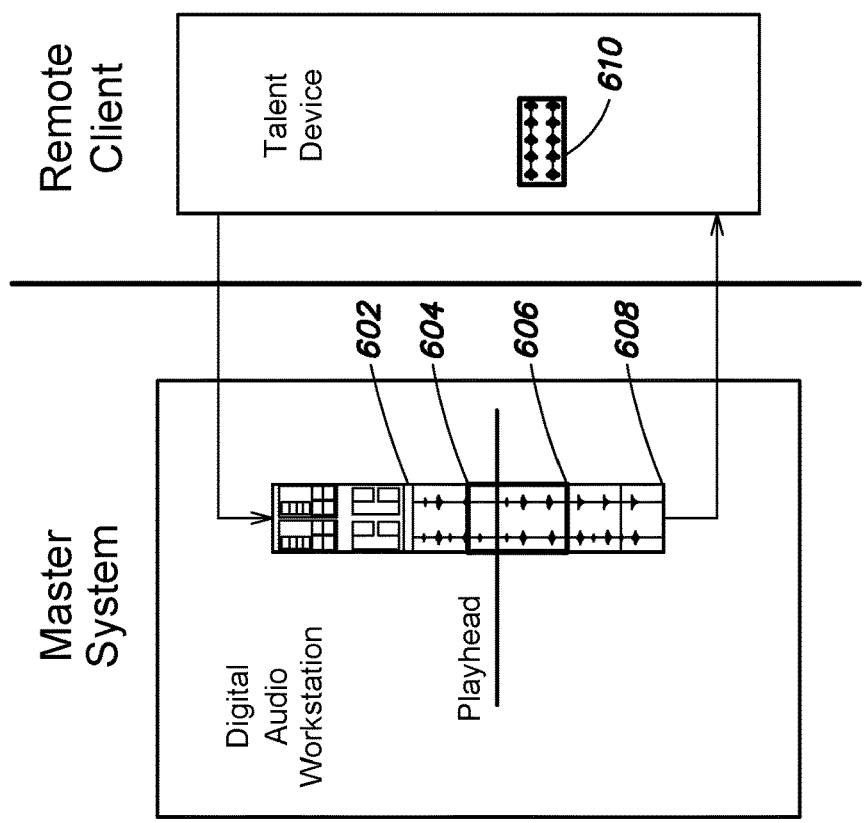
FIG. 6B
FIG. 6A (Prior Art)

NEAR REAL-TIME COLLABORATION FOR MEDIA PRODUCTION

CROSS REFERENCE TO RELATED APPLICATION

This application claims right of priority to and the benefit under 35 U.S.C. § 119(e) of U.S. provisional patent application Ser. No. 63/046,597, filed Jun. 30, 2020.

BACKGROUND

In traditional media production, the various parties participating in performing and editing the media are usually located in proximity to each other, generally within the same facility or even within a common physical space such as a studio or sound stage. In these circumstances the collaboration between the parties may be facilitated by direct line-of-sight communication, or by real-time electronic connections. For example, a performing talent may be located in a studio within a few tens of feet from an editor and a director with eye contact and the ability to talk to each other in real-time.

However, media production increasingly requires collaboration among participants who are not co-located in the same space or building, nor even in the same city or country. Such remote collaboration workflows are difficult due to connection latency and jitter, as well as the functional limitations of existing solutions. In addition, the Internet is not reliable for real-time isochronous connections such that delays and drop-outs may render a particular remote take of a performance unusable. The quality of real-time audio and video that is transmitted over wide area connections may also vary unpredictably.

Another aspect that is essential for effective collaborative workflows is the ability for the parties to communicate interactively with each other during all phases of the production, from playback and recording to review and approval. While such "talkback" capabilities are usually available when participants such as the talent, operator of the editing system, and director are co-located, they are often compromised or lacking entirely when participants are remote from each other.

There is a need to enable reliable, secure, and effective collaborative workflows for media production when the participants are not co-located.

SUMMARY

The methods described herein facilitate near real-time collaborative media production by parties located remotely from each other. The media production includes automated dialog replacement using remotely located voice talent, punch-in and punch-out of remotely recorded dialog replacement, and automatic contextual switching and overlaying of inter-party communication video based on a state of the media editing application on a master system.

In general, in a first aspect, a method of editing a media composition comprises: on a master system in a first location, concurrently: playing back a pre-recorded component of the media composition; streaming the pre-recorded component of the media composition to a talent device in a second location remote from the first location; receiving from the talent device a media stream of a newly-recorded component of the media composition, wherein for a given temporal location in the media composition, the media stream of the newly-recorded component is received after an incurred delay time with respect to a time when the corresponding pre-recorded component was streamed from the master system; generating a synchronized stream of an edited media composition comprising a combination of: the newly-recorded component as received from the talent device with the incurred delay; and a delayed stream of the pre-recorded component, the delayed stream being delayed by the incurred delay time; and outputting the synchronized stream on one or more media output devices of the master system.

Various embodiments include one or more of the following features. The synchronized stream is streamed to a device in a third location remote from the first location and the second location. The talent device: receives the streamed pre-recorded component of the media composition, wherein the received stream is delayed by an outbound latency incurred during transmission from the first location to the second location; outputs the received streamed pre-recorded component of the media production; generates the newly-recorded component of the media composition by recording at least one of audio and video captured from a talent co-located with the talent device, wherein the talent performs in synchrony with the received pre-recorded component; and streams the newly-recorded component to the master system. The incurred delay is the sum of the outbound latency, a latency introduced at the talent device, and an inbound latency incurred during transmission of the newly-recorded stream from the talent device to the master system. The pre-recorded component of the media composition includes video. Receiving a webcam video stream from the talent device; and outputting the webcam video stream to a display connected to the master system, wherein the output webcam video stream is synchronized with the synchronized stream of the edited media composition. The webcam video stream is overlayed as a picture on a video output of the synchronized stream of the media composition. The pre-recorded component includes video, and a video stream processor of the master system: receives an undelayed video stream of the pre-recorded video of the media composition; stores video frames in a video buffer for a time equal to or greater than the incurred delay time; provides undelayed video frames of the video stream for an undelayed video output channel; and provides delayed video frames of the video stream for one or more delayed video output channels.

In general, in another aspect, a method of editing a media composition comprises: enabling an operator of a media editing application hosted by a master system in a first location to define temporal locations within a pre-recorded component of the media composition, the temporal locations including a pre-roll location, a punch-in location, a punch-out location, and a post-roll location, wherein a portion of a media track of the media composition between the punch-in location and the punch-out location is to be replaced; starting at a defined pre-roll location, using the media editing application to play back and stream the pre-recorded component of the media composition to a talent device in a second location remote from the first location, wherein the stream includes a timestamp defining a temporal location in the media composition corresponding to the pre-roll location; if during the playback the media editing application receives a record command from the operator of the media editing application to initiate recording of the audio performance at the master system, after playback is completed, receiving from the talent device an audio file containing a newly-recorded component of the media composition corresponding to a temporal span of the media composition starting at the pre-roll location and ending at the post-roll location, wherein the audio file includes the timestamp; and wherein the media editing application: uses the received timestamp to align the received audio file with the pre-recorded component of the media composition; and automatically replaces the portion of the media track between the punch-in location and the punch-out location with the received audio file.

Various embodiments include one or more of the following features. A portion of the received audio file between the pre-roll location and the punch-in location is available to an operator of the media editing application for editing a portion of the media track between the pre-roll location and the punch-in location. During the playback the talent device: receives the stream of the pre-recorded component from the master system; captures an audio performance from a talent co-located with the talent device, the audio performance being performed in synchrony with the received stream of the pre-recorded component; stores a high quality recording of the audio performance; and streams a low quality recording of the audio performance to the master system; and during the playback the master system receives the streamed low quality recording from the talent device; if during the playback the media editing application receives a record command from the operator of the media editing application to initiate recording of the audio performance from the talent based on the received stream of the low quality recording, the media editing application sends a record tally to the talent device, and, after playback is completed, the talent device sends the high quality recording of the audio performance to the master system; and if during the playback the media editing application does not receive a record command from the operator of the media editing application to initiate recording of the audio performance from the talent, no record tally is sent to the talent device, and after playback is completed, the talent device discards the high quality recording of the audio performance.

In general, in a further aspect, a method of supporting communication among a plurality of parties participating in collaborative production of a video composition comprises: providing a master system hosting a media editing application in a first location, wherein an operator of the media editing application is able to place the media editing application into one of an idle mode, a playback mode for playing back the video composition, and a record mode for adding newly-recorded audio material to the video composition; displaying for the operator a video output of the media editing application and capturing video of the operator using a video camera connected to the master system; at a talent device in a second location remote from the first location and in data communication with the master system, displaying for a talent co-located with the talent device a video output on a display of the talent device and capturing video of the talent using a video camera of the talent device; wherein the media editing application automatically determines and causes to be displayed: on the video output of the media editing application one of playback of the video composition, the captured video of the talent, and a split display including both playback of the video composition and the captured video of the talent; and on the display of the talent device, one of playback of the video composition, the captured video of the operator, and a split display including both playback of the video composition and the captured video of the operator; and wherein the automatic determination is based on whether the media editing application, is currently in idle mode, playback mode, or record mode.

Various embodiments include one or more of the following features. When the media editing application is in idle mode, the media editing application causes the captured video of the talent to be displayed on the video output of the media editing application and the captured video of the operator to be displayed on the talent device display. When the media editing application is in one of playback mode and record mode, the media editing application causes one of: playback of the video composition to be displayed on the video output of the media editing application and on the talent device display; and a split display of playback of the video composition and captured video of the talent to be displayed on the video output of the media editing application, and a split display of playback of the video composition and captured video of the operator to be displayed on the talent device display. At a director device in a third location remote from the first and second locations and in data communication with the master system and the talent system, displaying for a director co-located with the director device a video output on a display of the director device and capturing video of the director using a video camera of the client device; wherein the media editing application automatically determines and causes to be displayed: on the video output of the director device one of playback of the video composition, the captured video of the talent, the captured video of the operator, and a split display including playback of the video composition and the captured video of one or both the talent and the operator; and on the display of the talent device, one of playback of the video composition, the captured video of the operator, the captured video of the director, and a split display including playback of the video composition and one or both of the captured video of the operator and the director and wherein the automatic determination is based on whether the media editing application, is currently in idle mode, playback mode, or record mode. When the master system is in idle mode, the automatic determination of what is caused to be displayed is based in part on a current audio volume of each of the plurality of collaborating parties including the operator, the talent, and the director, and wherein captured video of a party whose co-located device is currently receiving a loudest audio volume is displayed. When the master system is in one of playback mode and record mode and the playback of the video composition is split with a display of one or more of the operator, the talent, and the director, the automatic determination of a party to displayed is based in part on a current audio volume of each of the plurality of collaborating parties including the operator, the talent, and the director, and wherein captured video of a party co-located with a device that is currently receiving a loudest audio volume is displayed.

In general, in a yet another aspect, a computer program product comprises: a non-transitory computer-readable medium with computer-readable instructions encoded thereon, wherein the computer-readable instructions, when processed by a processing device instruct the processing device to perform a method of editing a media composition, the method comprising: on a master system in a first location, concurrently: playing back a pre-recorded component of the media composition; streaming the pre-recorded component of the media composition to a talent device in a second location remote from the first location; receiving from the talent device a media stream of a newly-recorded component of the media composition, wherein for a given temporal location in the media composition, the media stream of the newly-recorded component is received after an incurred delay time with respect to a time when the corresponding pre-recorded component was streamed from the master system; generating a synchronized stream of an edited media composition comprising a combination of: the newly-recorded component as received from the talent device with the incurred delay; and a delayed stream of the pre-recorded component, the delayed stream being delayed by the incurred delay time; and outputting the synchronized stream on one or more media output devices of the master system.

In general, in still another aspect, a master system comprises: a memory for storing computer-readable instructions; and a processor connected to the memory, wherein the processor, when executing the computer-readable instructions, causes the master system to perform a method of editing a media composition, the method comprising: on the master system in a first location, concurrently: playing back a pre-recorded component of the media composition; streaming the pre-recorded component of the media composition to a talent device in a second location remote from the first location; receiving from the talent device a media stream of a newly-recorded component of the media composition, wherein for a given temporal location in the media composition, the media stream of the newly-recorded component is received after an incurred delay time with respect to a time when the corresponding pre-recorded component was streamed from the master system; generating a synchronized stream of an edited media composition comprising a combination of: the newly-recorded component as received from the talent device with the incurred delay; and a delayed stream of the pre-recorded component, the delayed stream being delayed by the incurred delay time; and outputting the synchronized stream on one or more media output devices of the master system.

BRIEF DESCRIPTION OF THE DRAWINGS

FIGS. 6A and 6B illustrate replacement of a portion of a media production with remotely recorded audio that includes pre- and post-roll material.

DETAILED DESCRIPTION

A key challenge that arises when the parties involved in collaborative media production are not co-located is the synchronization of video and audio streams that originate from different locations. This challenge arises from the latencies that are incurred when audio and video signals travel between locations. Latencies arise both from the processing and routing of network signals, as well as the travel time of signals over the electrical and optical connections between locations. Furthermore, the latencies vary on various timescales producing jitter, and bandwidths can fluctuate, affecting the quality of received audio and video material. When such issues affect the synchronization of one part of a media production with another, such as between multiple audio tracks of an audio production or between a video stream and its corresponding audio, discrepancies of as little as a few milliseconds become noticeable.

Figure 1:
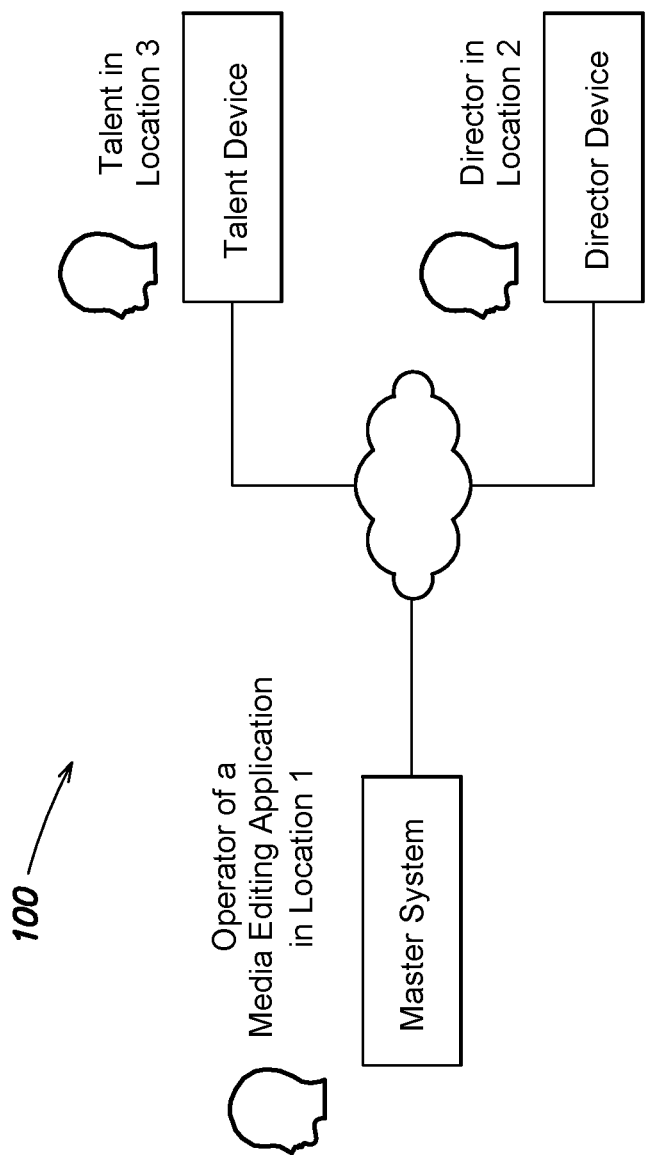
FIG. 1 is a simplified block diagram showing the locations of parties involved in remote collaboration media production.

Another set of problems arises from the need for the collaborating parties to communicate amongst themselves. A typical scenario is illustrated in FIG. 1. An operator using a media editing application hosted by a master system who is performing the editing operations and coordinating the workflow is in a first location. As used herein, the term "engineer," "operator," and "operator of the media editing application on the master system" are synonymous and are used interchangeably. The operator uses a master system, which may be a workstation or personal computer or other computer system. In some implementations, the master system is a mobile device. The master system runs a media editing application such as a digital audio workstation (DAW) or a non-linear video editing application (NLE). Digital audio workstations include the ability to make recordings, mix various tracks together, and interface to external plug-in modules, which may be hardware input/output devices, or software modules running on the same system as the digital audio workstation application. An example of such an application is Pro Tools®, a product of Avid® Technology, Inc. of Burlington, Mass. Non-linear video editing applications enable users to create video compositions that include multiple video and audio tracks. An example of such an application is Media Composer®, also a product of Avid Technology, Inc.

The requirements for the master system include: audio input and output capabilities, with a minimum of one input and two outputs; speakers and/or headphones and a microphone which are connected physically, over Bluetooth, or over an IP connection such as Audio Video Bridging (AVB); a network connection, either wired or wireless, or a cellular connection; an optional Webcam; and an optional external video output peripheral which may be required if the digital audio workstation application running on the master system lacks the ability to display video on its display or an external monitor.

As shown in high-level block diagram 100 of FIG. 1, the collaborative workflow includes a remote talent in a second location, and a director in a third location, with each of the first, second, and third locations being remote from each other.

Requirements for the talent system include: a platform with a built-in or attached display; and a connected microphone. Examples of such a platform include a tablet or a smartphone running an application which manages webcam and audio connections, including a local mix and connects with a service that brokers connections between clients and sends and receives audio/video streams. Alternatively, the talent platform may be a computer system with the same requirements as that of the master system, and that runs a media composition application, such as a digital audio workstation or a non-linear video editing application, as well as a Web browser to provide a connection to broker services and to manage audio and video connections. The talent system also requires a network or cellular connection. The director system has the same requirements to that of the talent system, though a connected microphone may not be required if a chat interface is available.

Another party in collaborative media production workflows is the director, who reviews the media production during the various phases of production and provides feedback for the other parties. In the scenarios described herein, the director is located in a second location remote from the operator of the media editing application on the master system. In certain workflows, the director may not be required, and the media production may proceed just with an operator at the master system and talent at a remote location. In other workflows, additional parties in the collaborative media production include one or more reviewers, each of which may be in a separate location and connect to the operator and talent with their own system or device connected to a wide area network. Communication with the reviewers mirrors that with the director, which is described below.

The director interacts with the parties using a personal device, such as a tablet or a smart phone, or using a computer system such as laptop computer or workstation.

We describe herein an example of a remote collaboration in which additional audio is to be recorded by a remote voice talent for use with a video production. In one typical use case, the newly recorded audio is to replace dialog of a video production that was recorded during the shooting of the video, a process referred to as automated dialog replacement (ADR). ADR may be used to re-record dialog that was not recorded with adequate quality during the set recording, to capture a better performance, to alter the dialog after shooting, to localize a production with dubbing in various languages, or to add a voice-over or off-screen dialog. As indicated in FIG. 1, the voice talent is located at a location remote from both the operator of the media editing application and the director and uses a personal device such as a tablet or smartphone, or a computer system such as a laptop or workstation. The master system, director device, and talent device are in data communication with each other via a wide area network such as the Internet.

Figure 2:
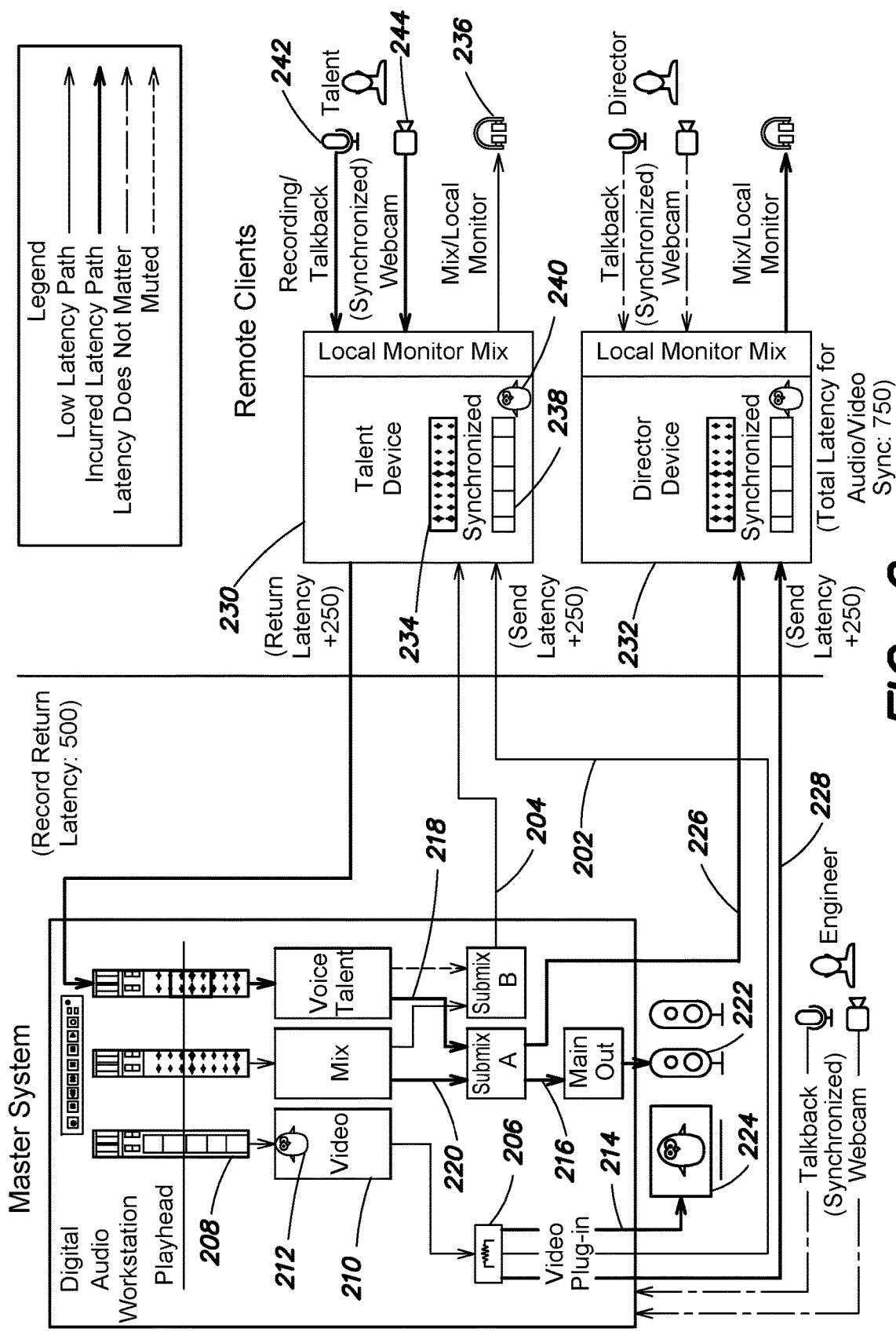
FIG. 2 is a high-level flow diagram showing the signal paths and latencies during record mode in a system for recording live remote automatic dialog replacement for a video production.

The process of recording an automatic dialog replacement when the talent is remote from the operator of the media editing application and the director is illustrated in FIG. 2. The embodiments described herein address the problems of latency and communication among the collaborating parties discussed above. This is achieved through the use of appropriate delays that are introduced automatically by the master system for the various production contexts that arise in remote collaboration workflows. The contexts include record mode, playback mode, and an idle mode when neither record or playback is occurring, but the parties are communicating with each other.

Three paths having different latencies are handled by the master system. In the low latency path, a signal is sent immediately when the master system transport begins to play the composition. In the incurred latency path, the signal is either "naturally" delayed as a result of travelling from the master system over the network to the talent system and back, or the signal is artificially delayed by the master system in order to synchronize with a signal that is naturally delayed. In the third latency path, the latency of the signal is not important since the signal does not need to be synchronized with either of the other two paths. In this latter latency path, the audio and video need only be in sync with each other, and the signals may arrive as rapidly as they can.

In order to record the remote talent, the engineer sets up three audio/video feeds, as illustrated in FIG. 2. The first feed is a low latency audio/video mix to be sent to the talent. The talent mix includes video component 202 as well as audio component 204, which omits the talent audio. This feed is streamed without delay to the talent. The video component is transmitted without delay from video stream processor 206, which receives the video signal from video playback of video track 208 by engine playback engine 210 of the digital audio workstation. The video picture 212 represented by video track 208 is indicated in the figure, and is available for display within a playback output window of the digital audio workstation application. The low latency feed incurs an outbound delay as it travels from the master system to the talent system. At the talent system, the talent performs in sync with the received audio/video feed, and the audio is recorded on the talent system in high quality while a compressed version is transmitted in real-time to the master system, incurring further delay associated with the inbound journey. The total incurred delay of the talent signal at the point when it is received by the master system, i.e., outbound delay plus inbound delay plus any delay caused by processing at the talent system, is referred to as the incurred delay.

The second feed set up by the engineer is the audio and video mix that is provided locally to the engineer and is referred to as the incurred delay feed. It enables the engineer to experience both the locally sourced video and audio and the remotely performed talent audio in sync with each other. To generate the incurred delay feed, as shown in FIG. 2, video stream processor 206 receives the low latency video signal, and delays it by the total incurred delay to generate incurred latency video feed 214. The incurred delay feed also includes delayed audio 216 consisting of naturally delayed talent audio 218 mixed with artificially delayed locally sourced audio 220. The incurred delay feed is sent to external speakers 222 and monitor/screen 224, which are monitored by the engineer.

The third feed that is set up by the engineer is audio mix 226 and video 228 for streaming to the director. This is the same as the feed monitored by the engineer, but it is streamed over the network to the director, who therefore receives the stream with a delay as compared to the engineer.

Thus, in record mode, the master system video stream processor receives the video stream from the master system (NLE or DAW) and generates three video streams, one in real-time (low latency feed) to send to the talent and two delayed streams (incurred latency feed) to output to the engineer video monitor and to stream over the network to the director. When received by the talent or director devices, the video streams may be handled by a standard plug-in module adapted to each device. An example of such a plug-in module is Open I/O, a product of Avid Technology, Inc. Similarly, the master system generates two audio mixes in parallel, one in real-time (low latency feed) to send to the talent and one delayed (incurred latency feed) synchronized with and incorporating the talent recording to output to the engineer speakers and to stream over the network to the director.

Video stream processor 206 may be implemented using software running on the CPU of the master system host and performs two roles. In the first role, it shares video frame buffers across multiple video output channels (which may, for example, be Open I/O plug-ins). In this respect, it behaves as a "manifold," in which a single video pipe received from the video processing component of the DAW or NLE is sent to multiple locations. To retain the speed required for processing uncompressed video streams, video stream processor 206 provides access to the same video buffer to each of the video outputs, thus obviating the need to duplicate the video stream. The video output channels themselves may be video hardware, or displays local to the master system, or may be network streaming protocols. In the second role, video stream processor 206 provides a delay line which allows some outputs to be delayed with respect to others. Each buffer is retained until the delay that needs to be inserted (i.e., the incurred delay) has expired.

The master system may obtain the total incurred latency from broker service or application located externally to the master system or alternatively hosted on the same system as master system. In some implementations, the master system transmits a ping to the talent to measure the round-trip time.

The illustrated remote clients include talent device 230 used by the talent, and director device 232 used by the director. The system requirements for the remote devices are described above. At talent device 230, received audio stream 234 is output to headphones 236 and received video stream 238 is output to the device display, which is integral to the device in the case of a tablet or smartphone. In the illustrated talent device, video picture 240 is indicated as appearing integrally within the device as in the case of a tablet system, but if the talent uses a computer system, the picture may be displayed on a connected external monitor. The talent voice or acoustic instrumental output is captured by built-in or external microphone 242, which is used both for the material to be recorded for the media production (in record mode), as well as for the talkback channel (in idle or playback mode). Integral or external webcam 244 captures video of the talent.

As illustrated in the figure, at director device 232, the received audio stream is output to headphones, and the received video stream is output to an internal display (as indicated) or to an external monitor. Talkback from the director is captured by a built-in or external microphone and a built-in or external webcam captures video of the director.

Similarly, as indicated in the figure, the engineer located with the master system is equipped with a microphone and webcam to capture the engineer's voice and video for communication among the parties.

Figure 3:
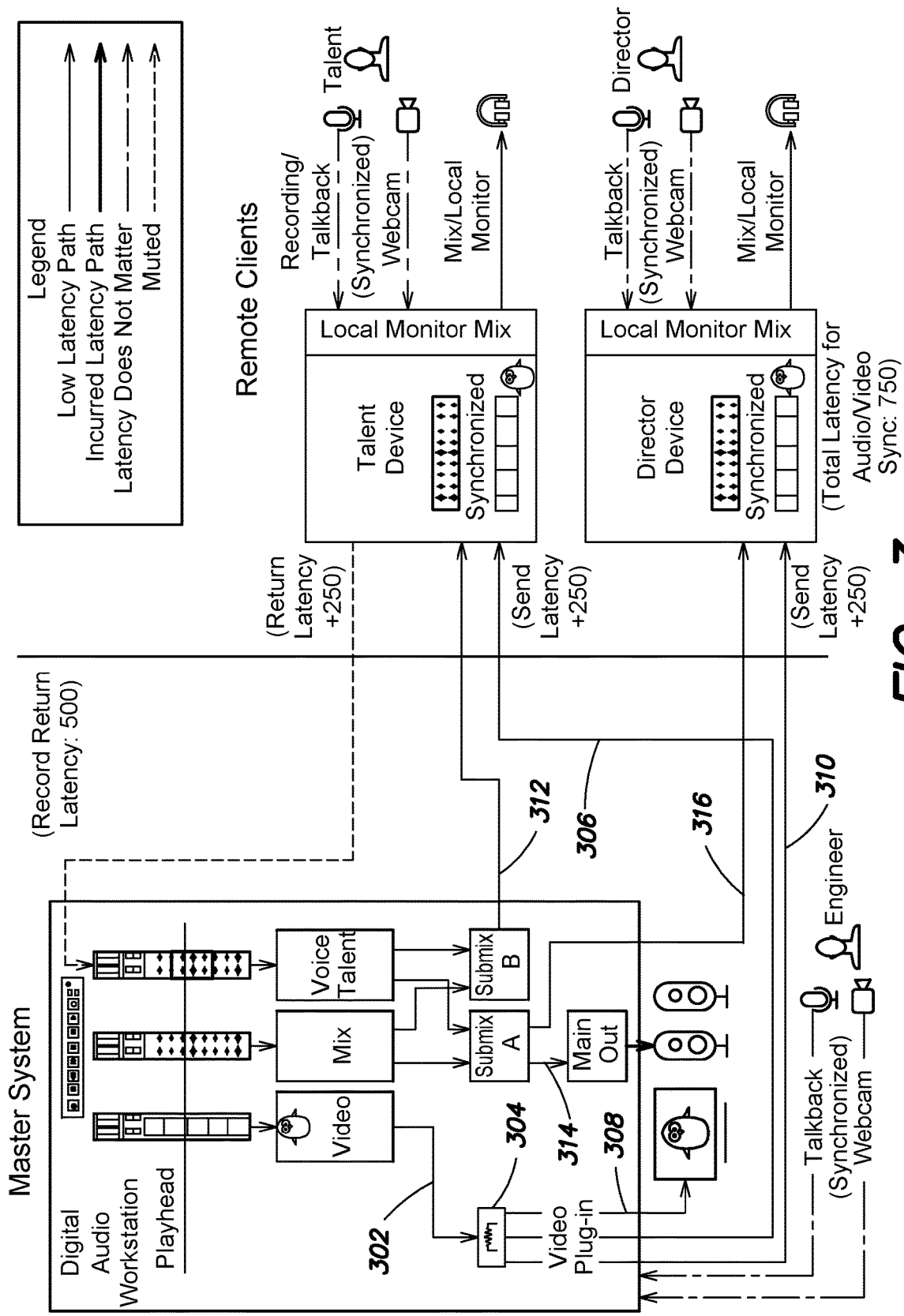
FIG. 3 is a high-level flow diagram showing the signal paths and latencies in the system of FIG. 2 during playback mode.

When the master system stops recording the talent track, and switches to idle or playback mode, there is no longer a role for the incurred latency feed since the master system is now the source of both the pre-recorded video and audio as well as the newly recorded talent audio. Thus, all audio and video are sent as soon as possible without the need for delays. FIG. 3 illustrates the signal pathways in playback mode. Low latency video signal 302 is triplicated by video plug-in 304, with signal 306 streamed to the remote talent device, signal 308 sent to the engineer video monitor, and signal 310 streamed to the director device. Similarly, the same audio feed, which includes the talent recording, is provided to all parties, with feed 312 streamed to the talent device, feed 314 output to the engineer main speakers, and feed 316 streamed to the director device.

We now describe methods for facilitating communication among the collaborating parties. During remote collaborative media production, the parties need to communicate with each other, at least in order to coordinate their actions and provide feedback. For example, talkback may be used to alert the talent as to when recording is starting and when it is stopped. Audio communication is captured by a microphone and sent on a talkback channel from each of the parties, while video is captured by a webcam and returned on a video channel. The webcam channels may be managed by the same service or application that manages the communication brokering, with the webcam video streamed directly into a window on the master system user interface or remote client device application, or hosted by a plug-in software module within the client device application.

In record mode, webcam communications from the talent are synchronized with the incurred latency signal paths. In playback mode, such communication does not need to be synchronized with the audio or video of the media production, and thus, for each party the talkback audio and webcam video just need to be synchronized with each other, but not to the talkback and webcam of the other parties. Thus, for these signal paths, latency does not need to be considered. FIGS. 2 (record mode) and 3 (playback mode) show the talkback and webcam signals from the parties to their respective systems. The communication signals between the systems are not shown in order to maintain clarity in the figures. In the case of the talent, a single audio path from the talent microphone to the talent device is used for the talent recording signal when the system is in record mode and is switched automatically to carry the talkback signal when recording stops.

Figure 4:
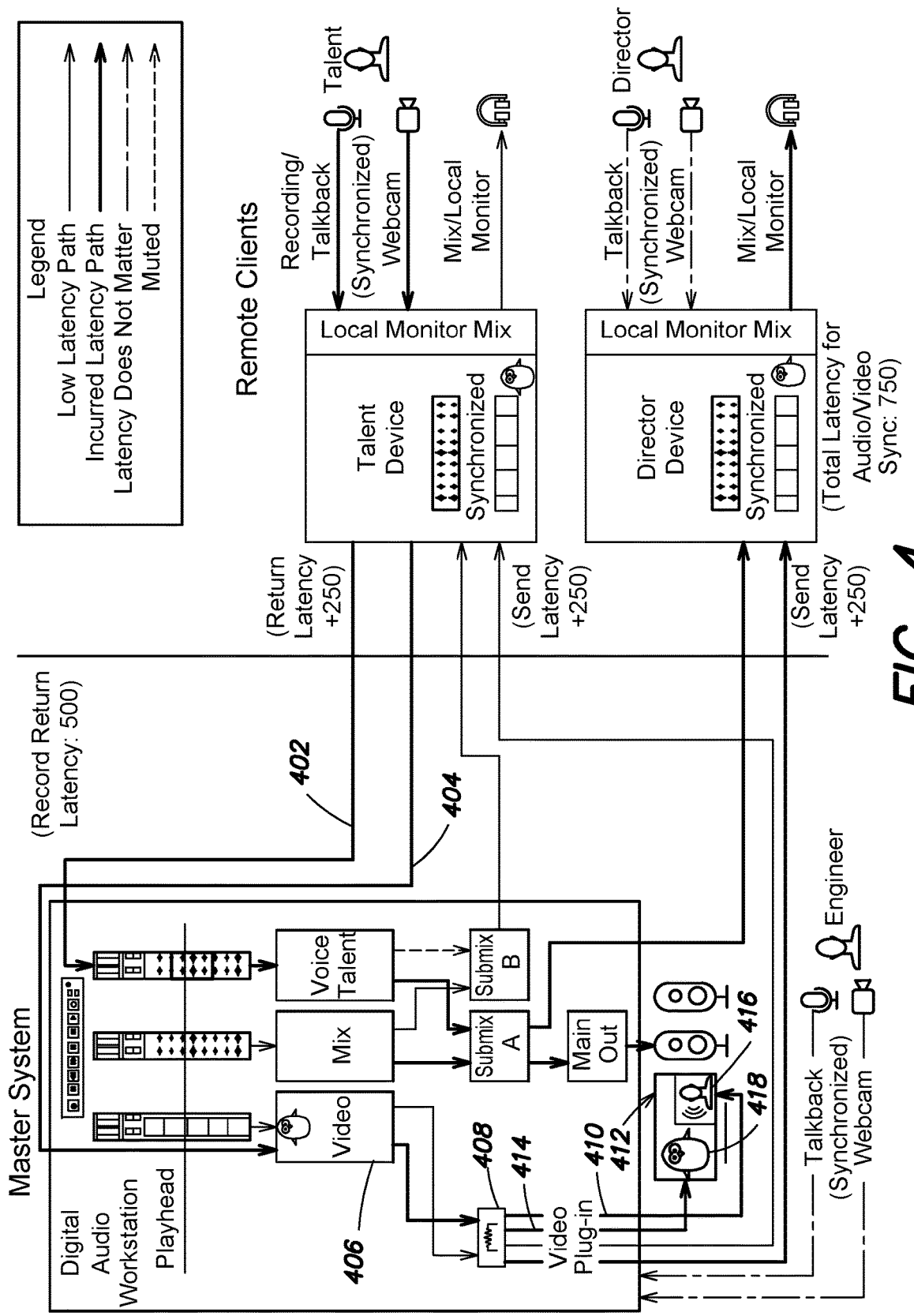
FIG. 4 is a high-level flow diagram showing the signal paths and latencies in the system of FIG. 2, with the insertion of a video feed of the talent into the video production output.

During both the recording and the playback, the engineer monitors the external video monitor and speakers. In traditional systems, the webcam and talkback audio would be provided to the engineer as a window in the digital audio workstation user interface, which may distract the engineer from the media production output. To help the engineer maintain focus on the production, in certain implementations the webcam video is incorporated into the video media video and displayed as a separate picture on the main output monitor (i.e., as picture in picture). During record mode, both the local media (video and audio) playback and the talent webcam signal are in the incurred latency mode, and thus they are displayed in sync. Referring to FIG. 4, in addition to talent record signal 402, talent webcam signal 404 is shown. This is received at video processing/playback module 406 of the media editing application on the master system and routed to video stream processor 408, which inserts it into the incurred latency video stream that is provided to the engineer and director. The video plug-in then processes the webcam video for display as a picture-in-picture with the main video output, and directs processed webcam video 410 to external monitor 412, along with the media production video signal 414. The webcam appears as a picture 416 within media production picture 418. The same picture-in-picture feed may also be streamed to the director (not shown in the figure). In some implementations, the webcam can be displayed on the master system display (not shown in the figure) as well as a picture-in-picture display on external client monitor 412.

The picture-in-picture combination of the webcam feed with the main video output may also be used in playback mode. In this case, there is no need to insert any delays since the production media will be in sync (as discussed above), and the latency requirements for the webcam communications among the parties are not stringent as they do not need to be exactly synchronized with the media.

Figure 5:
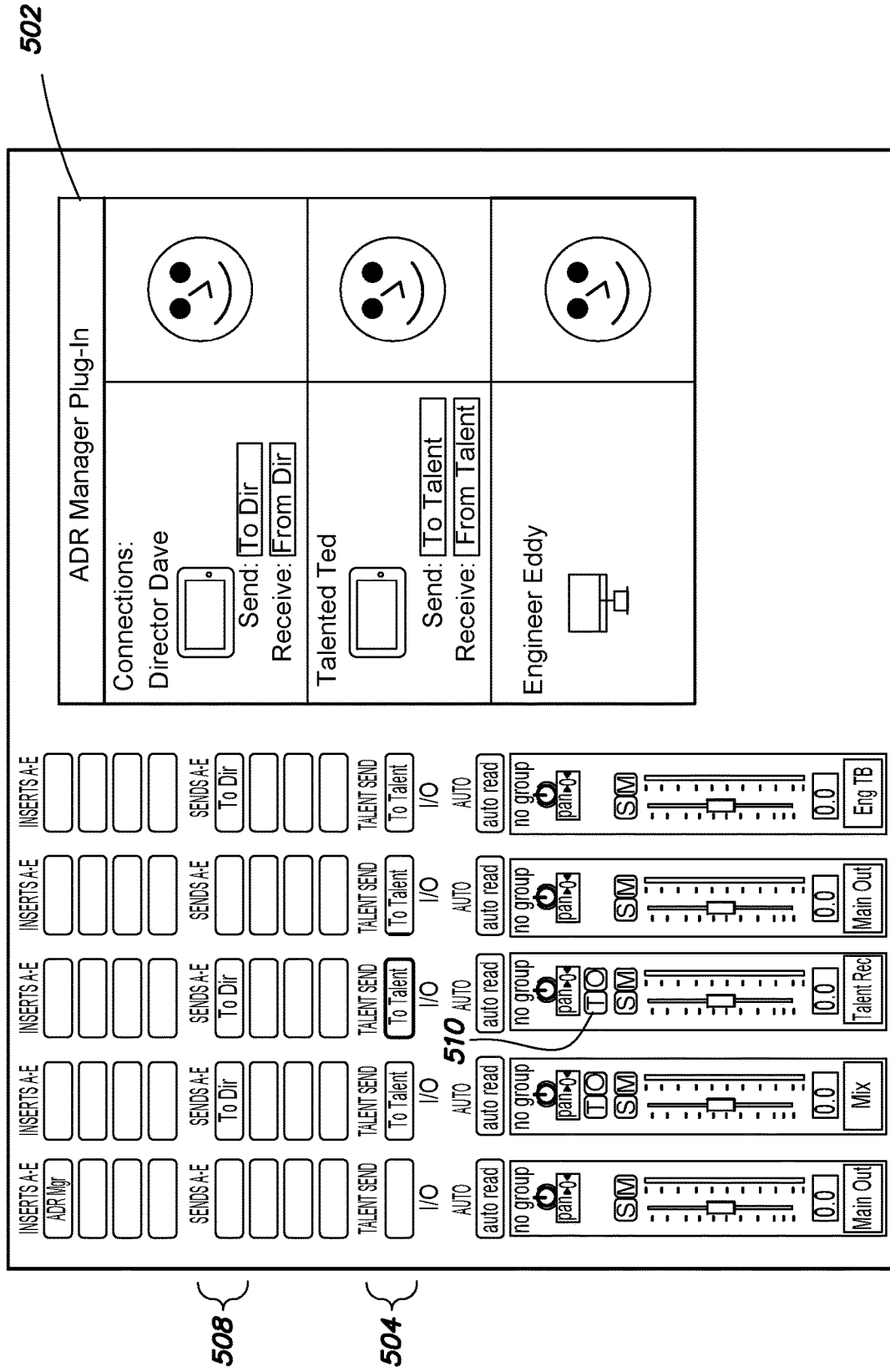
FIG. 5 illustrates a screenshot of a master system user interface for managing the various connections between the collaborating parties.

FIG. 5 illustrates a screenshot of a master system user interface with plug-in window 502 for managing the various connections between the collaborating parties. For example, it enables the engineer to add and remove participants, name the audio input and output connections, as well as view the various webcam feeds. The engineer defines what is sent on the low latency path to the talent, as shown in "talent send" row 504. Outputs that are assigned in this row are sent in the low latency mode when the master system transport is placed into record mode and one of the assigned tracks is having content recorded onto it, as shown at track 506. The tracks sent in the incurred latency mode to the director are shown at row 508. The engineer also has the option to continue to hear talkback from the talent even during playback, overriding the default rule that talent is muted during playback. In the example interface illustrated in FIG. 5, this option is selected with control 510, which provides a user interface for the engineer to add talkback to his feed in any mode. It enables the engineer to specify the media feeds (including those with delay) discussed above, as well as the talk-back and webcam streams.

In order to further assist communication among the parties, the rules that determine which party is shown in the webcam and talk-back channel may depend on the state of the master system. If the master system is idle, the conventional rule applies in which the person whose talk-back channel has the loudest volume is displayed. However, if the master system is in record or playback mode, other rules for each of the parties may automatically come into effect. In these modes, the media production video is automatically displayed on the remote client systems. In addition, the parties have the option to augment this by overlaying webcam communications. Which webcam video to overlay may be determined by the parties in advance, e.g., director takes priority, or may be determined automatically by the volume in the talkback channel, as in the idle mode. For the director and/or the engineer, the video feeds may be split between the talent and the media video. Thus, different video feed priority rules for each master system mode (idle, playback, record) may be specified separately for each of the participating parties. The rules are switched automatically when the master system mode is changed.

Another challenge that arises when recording talent located remotely from a master system occurs when the talent records just the portion between the engineer-specified punch in and punch out points. This leaves the engineer with no replacement material to be used before or after the specified portion for the purposes of transitions, such as cross-fades, or for other means of making a seamless edit. The problem does not arise when the replacement portion is recorded locally, as the master system starts recording at an engineer-specified pre-roll location and stops at a post-roll location. The recorded replacement material between the pre-roll location and the punch in location is available in the background for the use of the engineer.

To overcome this challenge, the remote talent recording device starts recording as soon as playback on the master system is initiated, rather than waiting till the punch-in location is reached. In a typical workflow, the engineer starts the playback at the pre-roll location (i.e., prior to the punch-in location). The master system sends a playback tally as well as a timestamp corresponding to the timeline location on the master system at which the playback commenced. When the talent device receives the playback tally it starts recording and uses the received timestamp to record the timestamp for the beginning of the file. If and when the engineer punches in to start the recording, a record tally is sent. While the recording of the talent is taking place, the remote talent device streams a compressed version of the talent recording to the master system for the engineer to monitor while playback is occurring. The talent device also writes a full quality version to a local audio file. At the master system, the compressed stream is mixed with a local mix to which the incurred delay has been added so the engineer and director can monitor the talent recording in sync with the existing media video and audio. Recording on the talent device continues until playback is stopped on the master system and a stop playback tally is sent, regardless of whether the engineer punches out first. If the engineer decided to record the talent and punched-in, the high-quality audio file is sent from the remote device to the master system, which uses the timestamp that specifies the beginning location of the file to insert the file in the correct location within the timeline. If the engineer did not initiate any recording, in which case no record tally is received by the talent device, the high-quality audio file is not sent and is discarded.

Since the remote device started recording as soon as the start playback tally was received and continued until playback stopped, the duration of the recorded replacement audio spans the timeline interval between the pre-roll location (i.e., where the engineer started to play back the media) and the post-roll location (where the engineer stopped playback). This provides the additional content that may be used in a cross-fade or other transition effect. FIGS. 6A and 6B illustrate this remote punch in/punch out workflow. In FIG. 6A, the prior art method of remotely recording only the portion between the punch in and punch out points is shown. In the master system timeline, the pre-roll portion is shown between pre-roll location 602 and punch-in location 604, the replacement portion starts at punch-in location 604 and ends at punch-out location 606, and the post-roll portion goes from punch-out location 606 to post-roll location 608. The talent device starts recording when the engineer punches in and a start recording tally is sent. Replacement portion 610 without pre- or post-roll is recorded and sent to the master system. At the master system, no replacement material is available for transitions outside the replacement portion.

The method described above is illustrated in FIG. 6B. As indicated in the figure, the talent device starts recording at a time corresponding to the pre-roll location and stops recording at the post-roll location. Thus, newly recorded pre-roll portion 612 and post-roll portion 614 is available for the engineer, in addition to replacement portion 610 between the punch in and punch in and punch out points.

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of editing a media composition, the method comprising:
    on a master system in a first location, concurrently:
        streaming a pre-recorded component of the media composition to a talent device in a second location remote from the first location;
        receiving from the talent device a media stream of a newly-recorded component of the media composition, wherein:
            the newly recorded component of the media composition was recorded by the talent device from a talent performing in synchrony with the pre-recorded component as received and output to the talent by the talent device; and
            for a given temporal location in the media composition, the media stream of the newly-recorded component is received at the master system after an incurred delay with respect to a time when the corresponding pre-recorded component was streamed from the master system to the talent device;
        generating a synchronized stream comprising:
            the newly-recorded component as received from the talent device; and
            a delayed stream of the pre-recorded component, the delayed stream being delayed by the incurred delay; and
        outputting the synchronized stream on one or more media output devices of the master system.

2. The method of claim 1, further comprising streaming the synchronized stream to a device in a third location remote from the first location and the second location.

3. The method of claim 1, wherein the talent device:
    receives the streamed pre-recorded component of the media composition, wherein the received stream is delayed by an outbound latency incurred during transmission from the first location to the second location;
    outputs the received streamed pre-recorded component of the media composition;
    generates the newly-recorded component of the media composition by recording at least one of audio and video captured from a talent co-located with the talent device, wherein the talent performs in synchrony with the received pre-recorded component; and
    streams the newly-recorded component to the master system.

4. The method of claim 3, wherein the incurred delay is the sum of the outbound latency, a latency introduced at the talent device, and an inbound latency incurred during transmission of the newly-recorded stream from the talent device to the master system.

5. The method of claim 1, wherein the pre-recorded component of the media composition includes video.

6. The method of claim 1, further comprising the master system:
    receiving a webcam video stream from the talent device; and
    outputting the webcam video stream to a display connected to the master system, wherein the output webcam video stream is synchronized with the synchronized stream of the edited media composition.

7. The method of claim 6, wherein the webcam video stream is overlayed as a picture on a video output of the synchronized stream of the media composition.

8. The method of claim 1, wherein the pre-recorded component includes video, and a video stream processor of the master system:
    receives an undelayed video stream of the pre-recorded video of the media composition;
    stores video frames in a video buffer for a time equal to or greater than the incurred delay time;
    provides undelayed video frames of the video stream for an undelayed video output channel; and
    provides delayed video frames of the video stream for one or more delayed video output channels.

9. A method of editing a media composition, the method comprising:
    enabling an operator of a media editing application hosted by a master system in a first location to define temporal locations within a pre-recorded component of the media composition, the temporal locations including a pre-roll location, a punch-in location, a punch-out location, and a post-roll location, wherein a portion of a media track of the media composition between the punch-in location and the punch-out location is to be replaced;

starting at a defined pre-roll location, using the media editing application to play back and stream the pre-recorded component of the media composition to a talent device in a second location remote from the first location, wherein the stream includes a timestamp defining a temporal location in the media composition corresponding to the pre-roll location;

if during the playback the media editing application receives a record command from the operator of the media editing application to initiate recording of the audio performance at the master system, after playback is completed, receiving from the talent device an audio file containing a newly-recorded component of the media composition corresponding to a temporal span of the media composition starting at the pre-roll location and ending at the post-roll location, wherein the audio file includes the timestamp; and wherein the media editing application:
uses the received timestamp to align the received audio file with the pre-recorded component of the media composition; and
automatically replaces the portion of the media track between the punch-in location and the punch-out location with the received audio file.

10. The method of claim 9, wherein a portion of the received audio file between the pre-roll location and the punch-in location is available to an operator of the media editing application for editing a portion of the media track between the pre-roll location and the punch-in location.

11. The method of claim 9, wherein:
during the playback the talent device:
receives the stream of the pre-recorded component from the master system;
captures an audio performance from a talent co-located with the talent device, the audio performance being performed in synchrony with the received stream of the pre-recorded component;
stores a high quality recording of the audio performance; and
streams a low quality recording of the audio performance to the master system; and
during the playback the master system receives the streamed low quality recording from the talent device;
if during the playback the media editing application receives a record command from the operator of the media editing application to initiate recording of the audio performance from the talent based on the received stream of the low quality recording, the media editing application sends a record tally to the talent device, and, after playback is completed, the talent device sends the high quality recording of the audio performance to the master system; and
if during the playback the media editing application does not receive a record command from the operator of the media editing application to initiate recording of the audio performance from the talent, no record tally is sent to the talent device, and after playback is completed, the talent device discards the high quality recording of the audio performance.

12. A method of supporting communication among a plurality of parties participating in collaborative production of a video composition, the method comprising:
providing a master system hosting a media editing application in a first location, wherein an operator of the media editing application is able to place the media editing application into one of an idle mode, a playback mode for playing back the video composition, and a record mode for adding newly-recorded audio material to the video composition;
displaying for the operator a video output of the media editing application and capturing video of the operator using a video camera connected to the master system;
at a talent device in a second location remote from the first location and in data communication with the master system, displaying for a talent co-located with the talent device a video output on a display of the talent device and capturing video of the talent using a video camera of the talent device;
wherein the media editing application automatically determines and causes to be displayed:
on the video output of the media editing application one of playback of the video composition, the captured video of the talent, and a split display including both playback of the video composition and the captured video of the talent; and
on the display of the talent device, one of playback of the video composition, the captured video of the operator, and a split display including both playback of the video composition and the captured video of the operator; and
wherein the automatic determination is based on whether the media editing application, is currently in idle mode, playback mode, or record mode.

13. The method of claim 12, wherein when the media editing application is in idle mode, the media editing application causes the captured video of the talent to be displayed on the video output of the media editing application and the captured video of the operator to be displayed on the talent device display.

14. The method of claim 12, wherein when the media editing application is in one of playback mode and record mode, the media editing application causes one of:
playback of the video composition to be displayed on the video output of the media editing application and on the talent device display; and
a split display of playback of the video composition and captured video of the talent to be displayed on the video output of the media editing application, and a split display of playback of the video composition and captured video of the operator to be displayed on the talent device display.

15. The method of claim 12, further comprising:
at a director device in a third location remote from the first and second locations and in data communication with the master system and the talent system, displaying for a director co-located with the director device a video output on a display of the director device and capturing video of the director using a video camera of the client device;
wherein the media editing application automatically determines and causes to be displayed:
on the video output of the director device one of playback of the video composition, the captured video of the talent, the captured video of the operator, and a split display including playback of the video composition and the captured video of one or both the talent and the operator; and
on the display of the talent device, one of playback of the video composition, the captured video of the operator, the captured video of the director, and a split display including playback of the video composition and one or both of the captured video of the operator and the director and wherein the automatic determination is based on whether the media editing application, is currently in idle mode, playback mode, or record mode.

16. The method of claim 15, wherein when the master system is in idle mode, the automatic determination of what is caused to be displayed is based in part on a current audio volume of each of the plurality of collaborating parties including the operator, the talent, and the director, and wherein captured video of a party whose co-located device is currently receiving a loudest audio volume is displayed.

17. The method of claim 15, wherein when the master system is in one of playback mode and record mode and the playback of the video composition is split with a display of one or more of the operator, the talent, and the director, the automatic determination of a party to displayed is based in part on a current audio volume of each of the plurality of collaborating parties including the operator, the talent, and the director, and wherein captured video of a party co-located with a device that is currently receiving a loudest audio volume is displayed.

18. A computer program product comprising:
a non-transitory computer-readable medium with computer-readable instructions encoded thereon, wherein the computer-readable instructions, when processed by a processing device instruct the processing device to perform a method of editing a media composition, the method comprising:
on a master system in a first location, concurrently:
streaming a pre-recorded component of the media composition to a talent device in a second location remote from the first location;
receiving from the talent device a media stream of a newly-recorded component of the media composition, wherein:
the newly recorded component of the media composition was recorded by the talent device from a talent performing in synchrony with the pre-recorded component as received and output to the talent by the talent device; and
for a given temporal location in the media composition, the media stream of the newly-recorded component is received at the master system after an incurred delay with respect to a time when the corresponding pre-recorded component was streamed from the master system to the talent device;
generating a synchronized stream comprising:
the newly-recorded component as received from the talent device; and
a delayed stream of the pre-recorded component, the delayed stream being delayed by the incurred delay; and
outputting the synchronized stream on one or more media output devices of the master system.

19. A master system comprising:
a memory for storing computer-readable instructions; and
a processor connected to the memory, wherein the processor, when executing the computer-readable instructions, causes the master system to perform a method of editing a media composition, the method comprising:
on a master system in a first location, concurrently:
streaming a pre-recorded component of the media composition to a talent device in a second location remote from the first location;
receiving from the talent device a media stream of a newly-recorded component of the media composition, wherein:
the newly recorded component of the media composition was recorded by the talent device from a talent performing in synchrony with the pre-recorded component as received and output to the talent by the talent device; and
for a given temporal location in the media composition, the media stream of the newly-recorded component is received at the master system after an incurred delay with respect to a time when the corresponding pre-recorded component was streamed from the master system to the talent device;
generating a synchronized stream comprising:
the newly-recorded component as received from the talent device; and
a delayed stream of the pre-recorded component, the delayed stream being delayed by the incurred delay; and
outputting the synchronized stream on one or more media output devices of the master system.

* * * * *